US009973291B2

(12) United States Patent
Goodall et al.

(10) Patent No.: US 9,973,291 B2
(45) Date of Patent: May 15, 2018

(54) COMBINED SIGNAL PRODUCED FROM SIGNAL COPIES

(71) Applicant: The United States of America, as represented by the Secretary of the Army, Washington, DC (US)

(72) Inventors: Steven Goodall, Lincoln University, PA (US); Shuguang Chen, Ellicott City, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 197 days.

(21) Appl. No.: 15/046,542

(22) Filed: Feb. 18, 2016

(65) Prior Publication Data

US 2017/0244505 A1    Aug. 24, 2017

(51) Int. Cl.
*H04J 1/08* (2006.01)
*H04L 5/00* (2006.01)

(52) U.S. Cl.
CPC .............. *H04J 1/08* (2013.01); *H04L 5/0058* (2013.01)

(58) Field of Classification Search
CPC ................................ H04J 1/08; H04L 5/0058
See application file for complete search history.

(56) References Cited

U.S. PATENT DOCUMENTS

| 4,609,889 | A * | 9/1986 | Kumar | H03H 11/36 257/270 |
| 6,049,307 | A * | 4/2000 | Lim | H01Q 3/2605 342/383 |
| 9,426,007 | B1 * | 8/2016 | Su | H04L 27/0012 |
| 2004/0067765 | A1 * | 4/2004 | Wayner | H04B 1/719 455/502 |
| 2004/0266368 | A1 * | 12/2004 | Rosnell | H03F 1/02 455/110 |
| 2006/0095093 | A1 * | 5/2006 | Bettesh | A61B 1/041 607/60 |
| 2006/0135097 | A1 * | 6/2006 | Wang | H04B 7/0857 455/132 |
| 2010/0029222 | A1 * | 2/2010 | Doubchak | H04B 7/0617 455/101 |
| 2010/0167769 | A1 * | 7/2010 | Lorgeoux | H04B 7/0408 455/500 |
| 2012/0163486 | A1 * | 6/2012 | Yim | H04L 5/0023 375/267 |
| 2014/0043184 | A1 * | 2/2014 | Malaga | H04B 7/0817 342/33 |
| 2015/0168549 | A1 * | 6/2015 | Fireaizen | G01S 13/758 375/211 |

* cited by examiner

*Primary Examiner* — Tejis Daya
(74) *Attorney, Agent, or Firm* — Ronald Krosky; Azza Jayaprakash

(57) ABSTRACT

Various embodiments are described that relate to a combined signal. A signal can be transmitted from a transmitter and be received by a receiver. The receiver can be an antenna array that comprises multiple individual antenna elements. At least some of these individual elements can receive the transmitted signal at different reception angles and these received signals can be considered signal copies. The reception angle can influence a power level of a signal copy. Multiple signal copies can be combined together into a combined signal that has a greater power level than the individual signal copies used in the combination.

20 Claims, 10 Drawing Sheets

|  | SW1 | SW2 | SW3 | SW4 | PD1 | PD2 | PD3 | PD4 |
|---|---|---|---|---|---|---|---|---|
| BEAM 1 | 1 | 1 | 1 | 1 | 0 | 1 | 1 | 0 |
| BEAM 2 | 2 | 1 | 1 | 1 | 0 | 0 | 1 | 1 |
| BEAM 3 | 2 | 2 | 1 | 1 | 1 | 0 | 0 | 1 |
| BEAM 4 | 2 | 2 | 2 | 1 | 1 | 1 | 0 | 0 |
| BEAM 5 | 2 | 2 | 2 | 2 | 0 | 1 | 1 | 0 |
| BEAM 6 | 3 | 2 | 2 | 2 | 0 | 0 | 1 | 1 |
| BEAM 7 | 3 | 3 | 2 | 2 | 1 | 0 | 0 | 1 |
| BEAM 8 | 3 | 3 | 3 | 2 | 1 | 1 | 0 | 0 |
| BEAM 9 | 3 | 3 | 3 | 3 | 0 | 1 | 1 | 0 |
| BEAM 10 | 4 | 3 | 3 | 3 | 0 | 0 | 1 | 1 |
| BEAM 11 | 4 | 4 | 3 | 3 | 1 | 0 | 0 | 1 |
| BEAM 12 | 4 | 4 | 4 | 3 | 1 | 1 | 0 | 0 |
| BEAM 13 | 4 | 4 | 4 | 4 | 0 | 1 | 1 | 0 |
| BEAM 14 | 1 | 4 | 4 | 4 | 0 | 0 | 1 | 1 |
| BEAM 15 | 1 | 1 | 4 | 4 | 1 | 0 | 0 | 1 |
| BEAM 16 | 1 | 1 | 1 | 4 | 1 | 1 | 0 | 0 |

FIG. 4

COMBINED SIGNAL PRODUCED FROM SIGNAL COPIES

GOVERNMENT INTEREST

The innovation described herein may be manufactured, used, imported, sold, and licensed by or for the Government of the United States of America without the payment of any royalty thereon or therefor.

BACKGROUND

In wireless communications, a signal can be transmitted from a transmitter and be received by a receiver. If the transmitter and receiver are physically far away from one another, then the power of the signal once the signal reaches the receiver may be weak. In addition, various other factors, such as interference, can cause the signal to be received with low power. Generally, it is preferable for a signal to be at a highest strength.

SUMMARY

In one embodiment, a system comprises an obtainment component and a combination component. The obtainment component, the combination component, or a combination thereof can be implemented, at least in part, by way of non-software. The obtainment component can be configured to obtain a first signal copy of a signal at a first power level received from a first antenna element and can be configured to receive a second signal copy of the signal at a second power level received from a second antenna element, where the first antenna element and the second antenna element are not the same antenna element. The combination component can be configured to combine the first signal copy with the second signal copy to produce a combined signal of a combined power level. The combined power level can be greater than the first power level and greater than the second power level.

In another embodiment, a system comprises a first antenna element configured to receive a first signal copy of a signal at a first power level from a first reception angle and a second antenna element configured to receive a second signal copy of the signal at a second power level from a second reception angle. A combiner can collect and combines the first signal copy with the second signal copy to produce a combined signal of a combined power level. The combined power level can be greater than the first power level and the second power level.

In yet another embodiment, a method comprises receiving a first signal copy at a first power level intercepted by a first antenna element at a first reception angle. The method also comprises receiving a second signal copy at a second power level intercepted by a second antenna element at a second reception angle. The first antenna element and the second antenna element are not the same antenna element. Additionally, the method comprises combining the first signal copy and the second signal copy into a combined signal with a combined power greater than the first power level and greater than the second power level.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

FIG. 4 illustrates one embodiment of a switch table;

DETAILED DESCRIPTION

Figure 1:
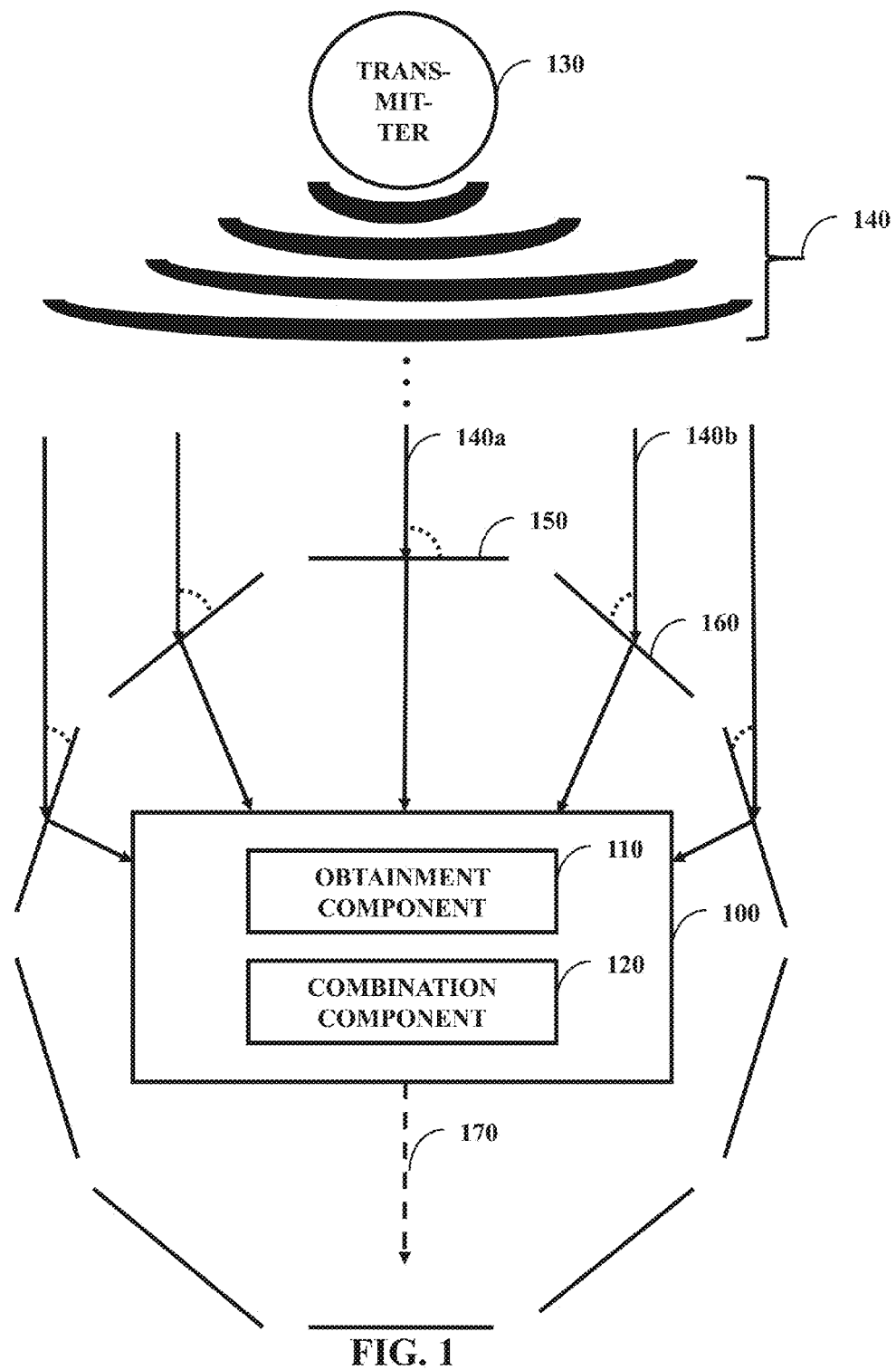
FIG. 1 illustrates one embodiment of a system comprising an obtainment component and a combination component.

In one embodiment, a combined signal can be produced at a receiver. The receiver can be implemented as an antenna array. With this antenna array, multiple antenna elements can be arranged such that no matter what direction a signal is transmitted, the antenna array can receive the signal. A typical signal can be transmitted omni-directionally. Therefore, multiple antenna elements can receive the signal, with the antenna elements receiving the signals at different angles. These angles can influence the power of the received signal. As opposed to using what is received at a single antenna element, what is received by multiple antenna elements can be combined to produce an output with a higher power than what is received by any one antenna element.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a system 100 comprising an obtainment component 110 and a combination component 120. The obtainment component 110 can be configured to obtain a plurality of signal copies (two or more). The obtainment component 110 can obtain these copies directly (e.g., the obtainment component 110 comprises a plurality of antenna elements) or indirectly (e.g., the obtainment component 110 receives the signal copies from at least some of the antenna elements of the plurality of antenna elements). At least some of these signal copies can be combined.

In one example, a transmitter 130 transmits a signal 140. The signal 140 can be received by multiple antenna elements—for example, a first antenna element 150 and a second antenna element 160. What the elements 150 and 160 receive can be considered copies 140a and 140b of the signal 140—the content can be substantially the same, but metrics of the copies 140a and 140b can be different based on how the elements receive the copies 140a and 140b.

The elements 150 and 160 are different elements. The elements 150 and 160 can be the exact same model, design, etc., but are considered two elements and not one single element. Even if the elements 150 and 160 are formed from one piece of material, their interception points can be different and therefore are considered different elements. The elements 150 and 160 can be adjacent to one another (e.g., be physically connected or be near one another without an intervening element). Further, the elements 150 and 160 can be part of a polygonal-forming array (an array of three or more sides). The polygonal array can completely form a shape (e.g., pentagon) or form part of a shape (e.g., three elements for half a hexagon). In one example, the part of a shape can be half of a shape that covers about 180 degrees with the non-element side being a wall or side of a vehicle. When the polygonal array is a full shape, such as illustrated in FIG. 1 as ten-sided polygon, the array can be non-enclosed (as in FIG. 1 since elements have spaces between) or enclosed (e.g., encloses to form a shape, but may still have openings, such as top and bottom openings, as visually depicted in views 610-630 of FIG. 6 discussed below).

In one example, the elements 150 and 160 can receive their respective copies 140a and 140b at different angles and locations. The angle and location of reception can be directly proportional to an amount of power and phase of the signal copy (e.g., strength and delay of a radio frequency (RF) signal)—the closer to perpendicular the signal copy is to the element, the higher the power and the less the time delay for the signal copy. While a most powerful signal copy—here, signal copy 140a—can be used, it can be better to combine multiple signal copies together.

With this, the obtainment component 110 is configured to receive the first signal copy 140a of the signal 140 at a first power level received from a first antenna element 150 and configured to receive the second signal copy 140b of the signal 140 at a second power level received from the second antenna element 160. As can be seen in FIG. 1, the angle where the copy 140a intersects with the element 150 is closer to perpendicular than the angle where the copy 140b intersects the element 160. Therefore, the first signal copy 140a can have greater power and less time delay than the second signal copy 140b.

The combination component 120 is configured to combine the first signal copy 140a with the second signal copy 140b (e.g., digital representations of these signals sent from the elements 150 and 160, respectively) to produce a combined signal 170 of a combined power level. The combined power level is greater than the first power level and is greater than the second power level. By way of example, the power of the first signal copy 140a can be a value of 1 and the power of the second signal copy 140b can be a value of 0.667. The combined signal can be of a value of 1.667, but may be less due to combining losses.

Figure 2:
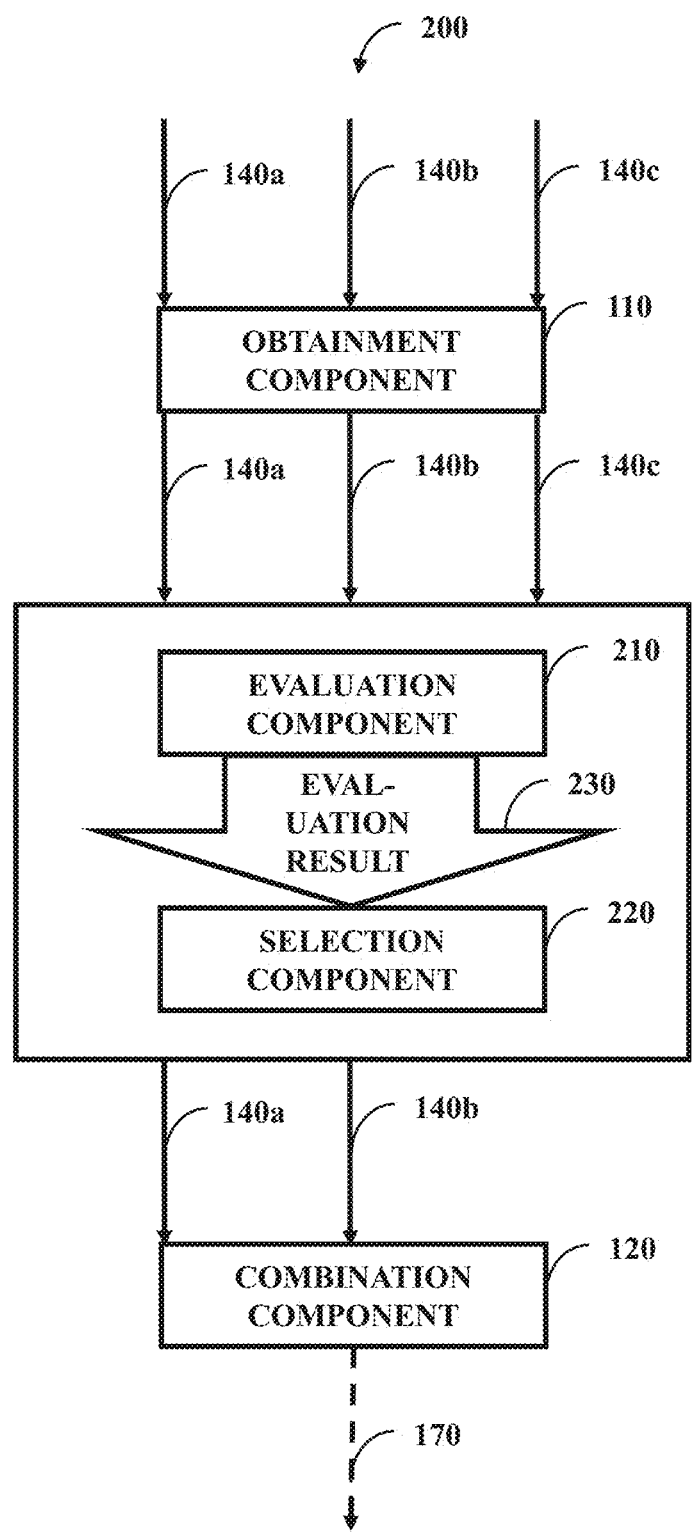
FIG. 2 illustrates one embodiment of a system comprising an evaluation component, a selection component, the obtainment component, and the combination component.

FIG. 2 illustrates one embodiment of a system 200 comprising an evaluation component 210, a selection component 220, the obtainment component 110, and the combination component 120. The obtainment component 110 can obtain a plurality of signal copies. In one example, the obtainment component 110 can be configured to receive a third signal copy 140c of the signal 140 of FIG. 1 at a third power level received from a third antenna element. The third signal copy 140c can be the signal copy on the right of the signal copy 140b of FIG. 1 and be received by the antenna element adjacent to, and to the right of the second antenna element 160 of FIG. 1.

As discussed above, the signal 140 of FIG. 1 may experience losses from the transmitter to the antenna array, to the obtainment component 110 of FIG. 1, or to the combination component 120 of FIG. 1. Due to these losses, additional some signal copies may have little value and/or be detrimental to the combined signal 170. Therefore, the system 200 can determine what signal copies to combine.

The evaluation component 210 is configured to evaluate the first signal copy 140a, the second signal copy 140b, and the third signal copy 140c to produce an evaluation result. The selection component 220 can be configured to select a combination group for combination by the combination component 120 and the combination component 120 can combine the individual signal copies 140a and 140b of the combination group (e.g., combine exclusively what is in the combination group) into the combined signal 170. The combination group can be selected, based at least in part, on the evaluation result, and can comprise the first signal copy and the second signal copy (e.g., while not comprising the third signal copy).

In one embodiment, the evaluation component 210 can substantively analyze individual signal copies to determine an amount of power the copy would add to the combined signal. The selection component 220 can determine if the copy would be worth adding to the combined signal and based on this determination, select the copy for inclusion in the combination group or not. In one example, this can be based on comparing power added against a threshold, such as a pre-defined threshold.

Figure 3:
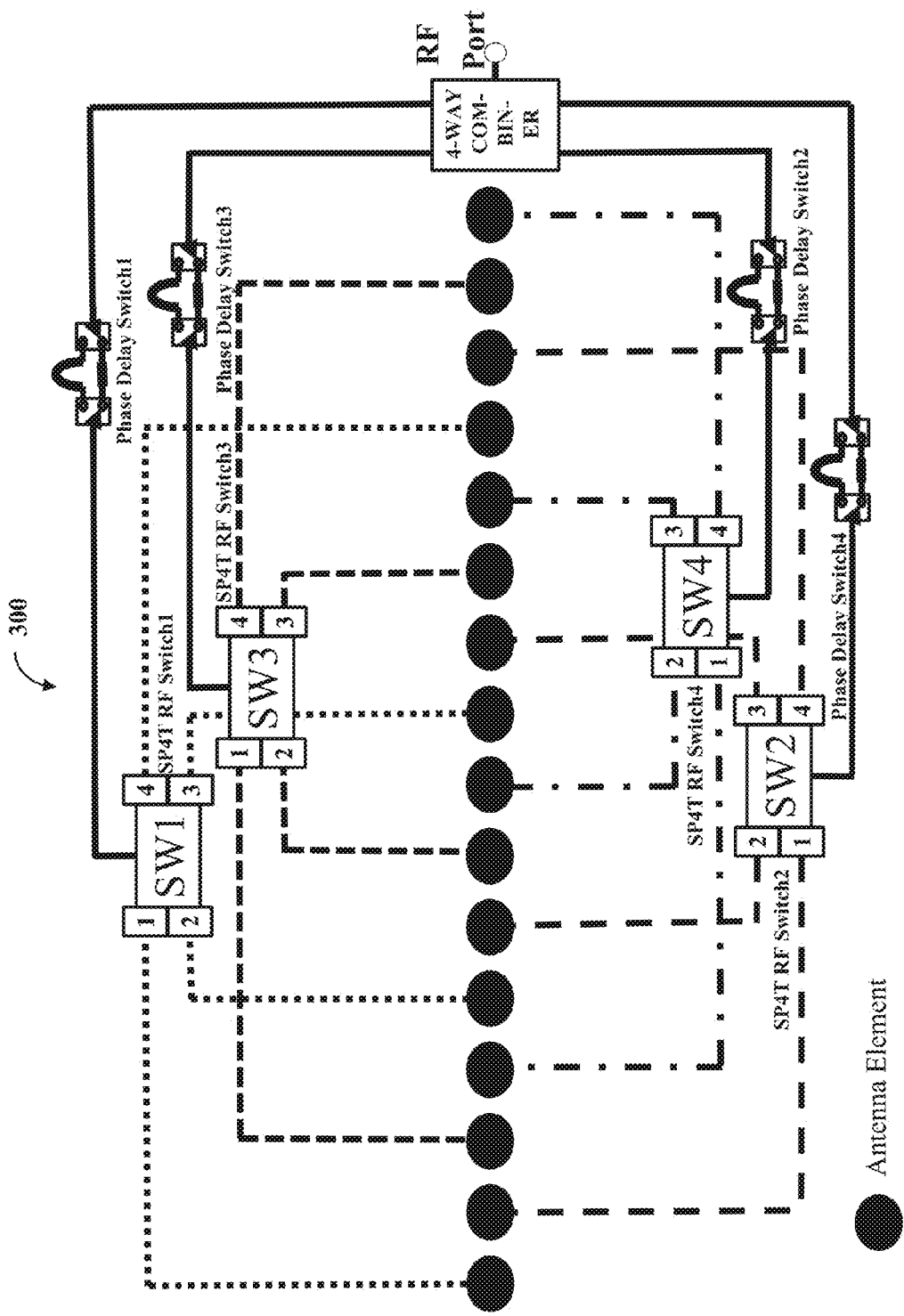
FIG. 3 illustrates one embodiment of an antenna system.

FIG. 3 illustrates one embodiment of an antenna system 300. The antenna system 300 can comprise sixteen antenna elements. While shown in a line, the antenna elements can form a polygon such that the furthest right antenna element is next to the furthest left antenna element. The antenna elements can be grouped into sets of four elements—with elements in a group being separated by three elements. The element groups can be connected to their own switches. The switches can be active for one element at a time and therefore not be used for the other three elements in a group.

In one example, the fifth element from the left can be the first element to receive a signal (e.g., as the element 150 of FIG. 1 would be the first to receive the signal 140 of FIG. 1 since the element 150 of FIG. 1 is physically closest to the transmitter 130 of FIG. 1), and this can be identified by the evaluation component 210 of FIG. 2. With this, switch 1 (SW1) could have its second connection active and connections 1, 3, and 4 deactivated. Similarly, switch 2 can have its second connection active and switch 4 can have its first connection active. Therefore, the two physically closest elements can also be used. A choice can be made (e.g., by the selection component 220 of FIG. 2) to use either the third from the left element or the seventh from the left element therefore using either connection 1 or 2 of switch 3. The switches 1-4 can be single pole 4 throw RF switches. In one embodiment, switch settings can be selected based on the four most perpendicular impacting signal copies.

In one embodiment, signal copies can be out of phase. Therefore, phase delay switches can be employed. With this embodiment, copies can be delayed so that signal copies are closer in phase when they reach a combiner (e.g., the four-way combiner that is connected by way of an RF port). This can make the signal copies easier to combine and/or provide for a better quality combined signal. In this embodiment, the phase delays switches 1-4 illustrated can function as an example delay component configured to delay the first signal copy 140a of FIG. 1 such that the first signal copy 140a of FIG. 1 is closer in phase to the second signal copy 140b of FIG. 1 than absent the delay. The combination component 120 of FIG. 1 can be configured to combine the first signal copy 140a of FIG. 1 after delay with the second signal copy 140b of FIG. 1 to produce the combined signal 170 of FIG. 1. It is to be appreciated by one of ordinary skill in the art that different configurations can be used, such as with or without switches.

FIG. 4 illustrates one embodiment of a switch table 400. The switch table 400 can be a designation on how to configure the on/off characteristics of the switches and phase delay switches of FIG. 3. In one embodiment, the configuration for the system 300 of FIG. 3 can be such that a first struck or highest power receiving element is designated as the prime element. In one example, the furthest left antenna element can be first struck with a signal copy called beam 1. With beam 1, each of the four switches SW1-SW4 can be designated as being set to 1 and therefore the four furthest left elements are used. In addition, the second and third elements can have their signal copies experience phase delays in accordance with the switch table 400.

Figure 5:
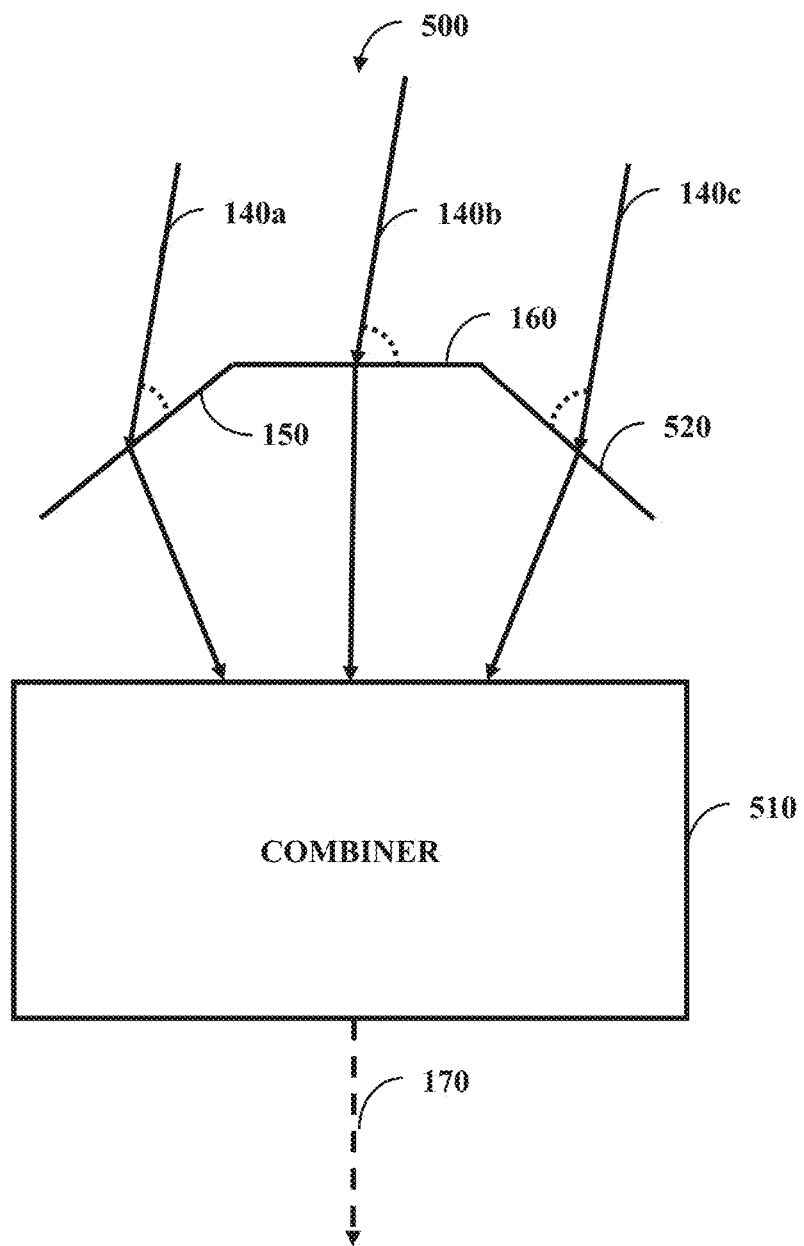
FIG. 5 illustrates one embodiment of an environment upon which a combiner functions.

FIG. 5 illustrates one embodiment of an environment 500 upon which a combiner 510 functions. With this environment, three antenna elements are illustrated: the first antenna element 150, the second antenna element 160, and a third antenna element 520. However, other configurations with more or less antenna elements can be implemented. In one embodiment, the first antenna element 150 is adjacent to the second antenna element 160 and the second antenna element 160 is adjacent to the third antenna element 520. These elements can work together to create a greater interception area than a single antenna element. In one embodiment, the antenna elements 150, 160, and 520 form an enclosed polygonal array.

The first antenna element 150 can be configured to receive the first signal copy 140a of the signal 140 at a first power level from a first reception angle. Additionally, the second antenna element 160 can be configured to receive the second signal copy 140b of the signal 140 at a second power level (e.g., lower than the first power level) from a second reception angle. The combiner 510 (e.g., the system 100 of FIG. 1) collects and combines the first signal copy 140a with the second signal copy 140b to produce the combined signal 170 of a combined power level that is greater than the first power level and/or the second power level. In one example, the combined power level is the sum of the first power level and the second power level minus losses (e.g., losses caused by an internal aspect of the combiner 510).

The third antenna element 520 can be configured to receive a third signal copy 140c of the signal 140 at a third power level (e.g., lower than the second power level) from a third reception angle. The power levels can be proportional to their respective reception angles. Accordingly, the closer the reception angle is to 90 degrees, the higher the power level (e.g., the closer the power level is to 1).

The combiner 510 can function such that it does not combine the third signal copy 140c into the combined signal 170, or combine the third signal copy 140c into the combined signal 170. The determination of whether to combine or not can be based, at least in part, on predicted value added of the third signal copy 140c to the combined signal 170, how many other signal copies are already added/to be added, etc. In one example, the combiner 510 does not combine the third signal copy due to the third reception angle being too small in comparison to a threshold.

In one embodiment, the antenna elements 150, 160, and 520 can transfer their respective signal copies 140a-140c to the combiner 510 and the combiner 510 can decide what to combine into the combined signal 170. In one embodiment, a transfer component is configured to cause transfer of the first signal copy 140a and second signal copy 140b to the combiner 510, and prevent transfer of the third signal copy 140c to the combiner 510 (e.g., the obtainment component 110 of FIG. 1 functions as the transfer component and only transfers the signal copies actually to be combined to the combiner 510 with the combiner 510 functioning as the combination component 120 of FIG. 1). In one embodiment, the transfer component is three components—one that is part of the individual antenna elements 150, 160, and 520. With this, the elements 150, 160, and 520 transfer their respective copies to the combiner 510 when a condition is met (e.g., the reception angle is over a threshold or the power level is over a threshold). En route to the combiner 510 and/or while at the combiner 510, the signal copies can be processed, such as prior to being combined by the combiner 510, the first signal copy 140a is subjected to phase delay to bring the first signal copy 140a closer in phase to the second signal copy 140b.

Figure 6:
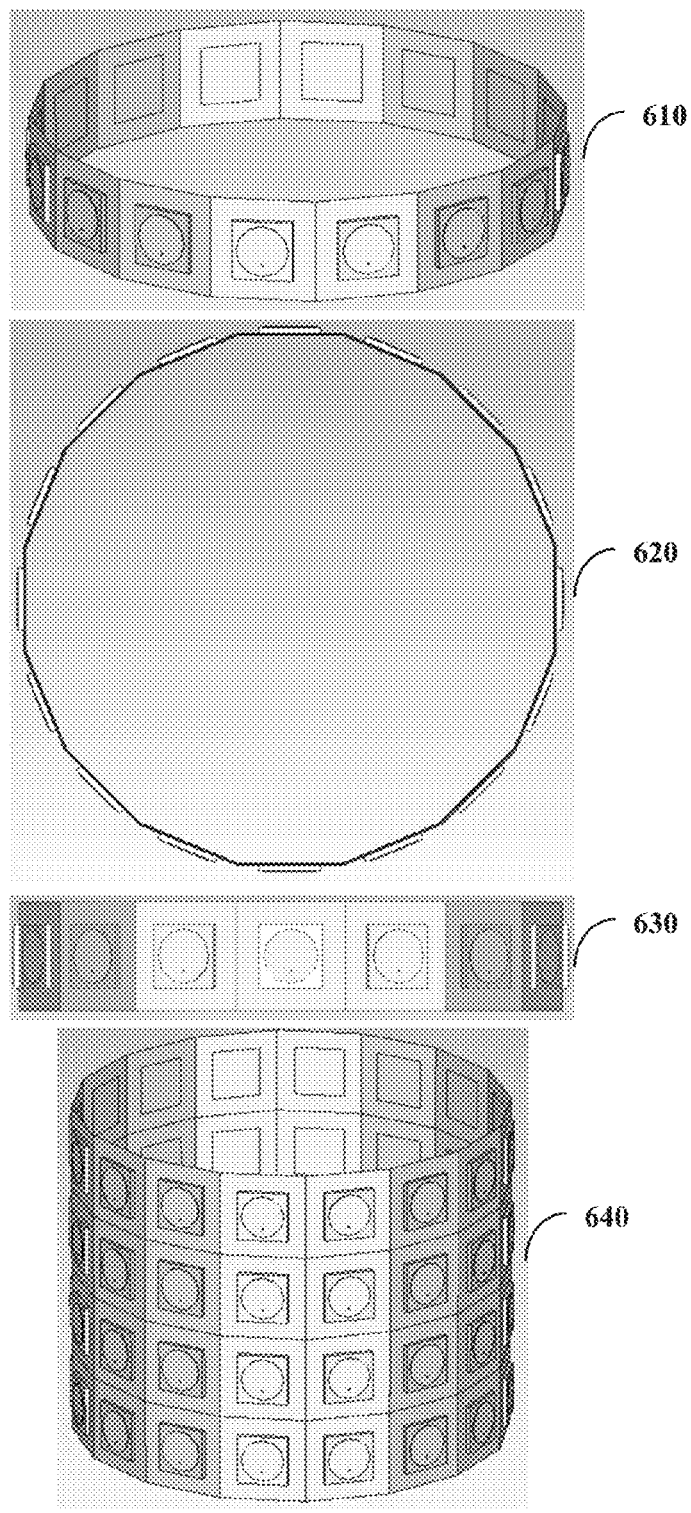
FIG. 6 illustrates one embodiment of a view set of a single antenna array and one embodiment of a stacked antenna array.

FIG. 6 illustrates one embodiment of a view set 610-630 of a single antenna array and one embodiment of a stacked antenna array 640. The single antenna array of views 610-630 is of an enclosed polygonal array (e.g., attempting to replicate a circle or functionally replicating a circle). View 610 is a perspective view, view 620 is a top-down view, and view 630 is a side view of the array. The elements of the array can face outward and can radiate and/or receive RF energy from their front sides (e.g., as well as at least partially on their back sides). Example antenna elements can include micro-strip patch antenna elements, dipole antenna elements, slot antenna elements, or inverted F antenna elements. Further, the elements can be, for example, vertically polarized, horizontally polarized, right hand circularly polarized, left hand circularly polarized, or duel polarized.

Multiple rings of antenna elements can be stacked together as illustrated in the stacked antenna array 640. The system 100 of FIG. 1 and/or the combiner 510 of FIG. 5 can combine signal copies from different stack levels. This includes combining signals of elements that are adjacent along the x-axis, adjacent along the y-axis, or not adjacent.

Figure 7:
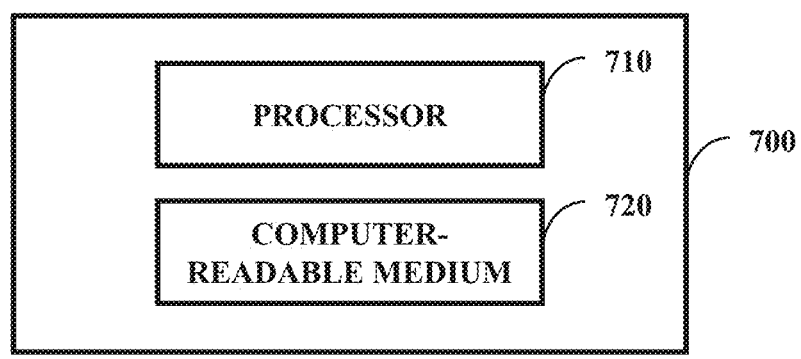
FIG. 7 illustrates one embodiment of a system comprising a processor and a computer-readable medium.

FIG. 7 illustrates one embodiment of a system 700 comprising a processor 710 (e.g., a general purpose processor or a processor specifically designed for performing functionality disclosed herein) and a computer-readable medium 720 (e.g., non-transitory computer-readable medium). In one embodiment, the computer-readable medium 720 is communicatively coupled to the processor 710 and stores a command set executable by the processor 710 to facilitate operation of at least one component disclosed herein (e.g., the evaluation component 210 of FIG. 2, the selection component 220 of FIG. 2, the transfer component discussed with regard to FIG. 5, etc.). In one embodiment, at least one component disclosed herein (e.g., the obtainment component 110 of FIG. 1, the combination component 120 of FIG. 1, etc.) can be implemented, at least in part, by way of non-software, such as implemented as hardware by way of the system 700. In one embodiment, the computer-readable medium 720 is configured to store processor-executable instructions that when executed by the processor 710, cause the processor 710 to perform a method disclosed herein (e.g., the methods 800-1000 addressed below).

Figure 8:
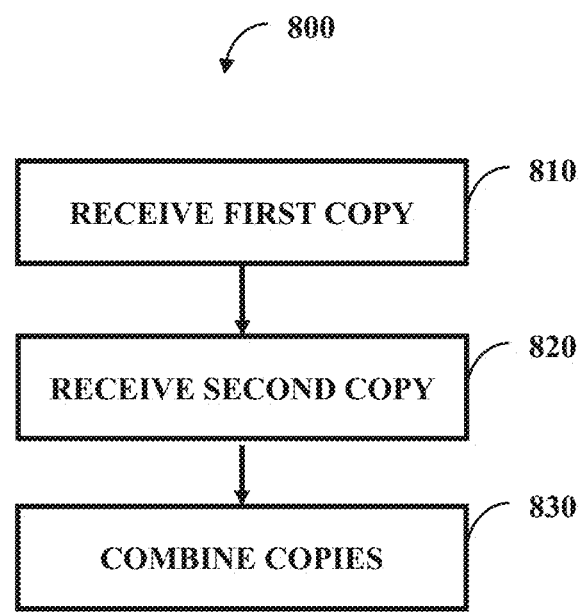
FIG. 8 illustrates one embodiment of a method comprising three actions.

FIG. 8 illustrates one embodiment of a method 800 comprising three actions 810-830. At 810, receiving the first signal copy 140a of FIG. 1 at a first power level occurs. The copy 140a of FIG. 1 is intercepted by the first antenna element 150 of FIG. 1 at a first reception angle (e.g., where the first power level is proportional to the first reception angle). This interception can be the reception. Also, the interception can be separate from the reception (e.g., reception is from transfer of the copy 140a of FIG. 1 to the first antenna element 150 of FIG. 1). Similarly, at 820, receiving the second signal copy 140b at a second power level can occur such that the second signal copy 140b is intercepted by the second antenna element 160 (e.g., different from the first antenna element 150 of FIG. 1 and together forming an enclosed polygonal array) at a second reception angle (e.g., where the second power level is proportional to the second reception level). At 830, combining the first signal copy 140a of FIG. 1 and the second signal copy 140b of FIG. 1 into the combined signal 170 of FIG. 1 can occur. The combined signal 170 of FIG. 1 has a combined power greater than the first power level and greater than the second power level.

Figure 9:
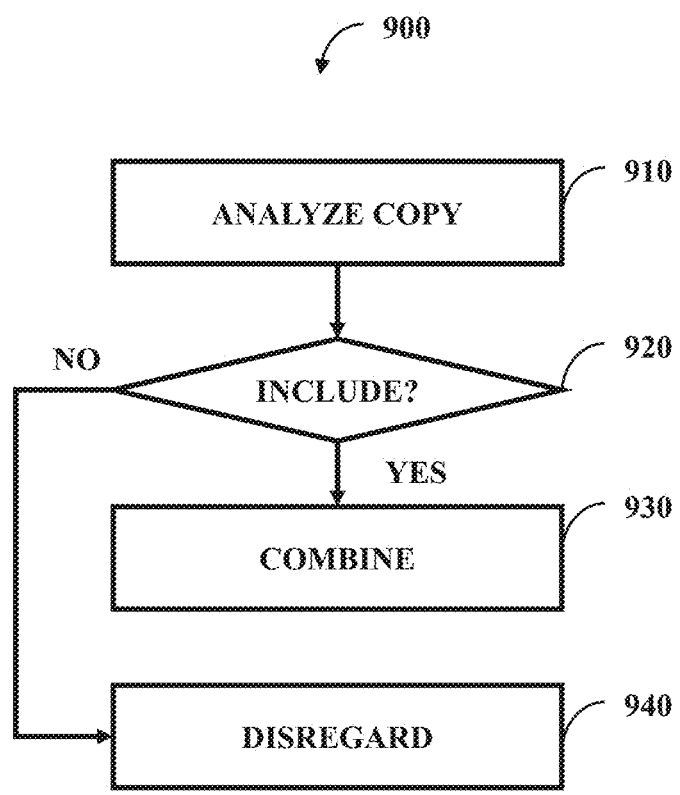
FIG. 9 illustrates one embodiment of a method comprising four actions.

FIG. 9 illustrates one embodiment of a method 900 comprising four actions 910-940. At 910, a signal copy can be analyzed (e.g., the first signal copy 140a of FIG. 5, the second signal copy 140b of FIG. 5, and/or the third signal copy 140c of FIG. 5). Analysis can comprise various aspects.

In one embodiment, analyzing comprises delaying a phase of the first signal copy 140a of FIG. 5 to bring the first signal copy 140a of FIG. 5 closer in phase to the second signal copy 140b of FIG. 5 (or vice versa for delaying the second signal copy 140b of FIG. 5). The first signal copy 140a of FIG. 5 after being delayed and the second signal copy 140b of FIG. 5 are combined into the combined signal 170 of FIG. 5 with the combined power. This delaying of the first signal copy 140a of FIG. 5 can be expressly done (e.g., intentionally done, such as through a switch illustrated in the system 300 of FIG. 3) while the second signal copy 140b of FIG. 5 can be not expressly delayed (e.g., may experience unintentional delay, but not intended delay).

The third signal copy 140c can be received at a third power level intercepted by the third antenna element 520 (e.g., part of the enclosed polygonal array and different from the first and second antenna element) at a third reception angle and disregarding the third signal copy 140c of FIG. 5 such that the third signal copy is not combined into the combined signal 170 of FIG. 5. At 920, a check can take place to evaluate the third signal copy 140c of FIG. 5 and determine if the third signal copy 140c of FIG. 5 should be combined, at 930, into the combined signal 170 of FIG. 5 or disregarded at 940. This disregarding of the third signal copy 140c of FIG. 5 can be such that the third signal copy 140c of FIG. 5 is not combined into the combined signal 170 of FIG. 5.

In one embodiment, the analyzing at 910 can include evaluating the third signal copy 140c of FIG. 5 against a metric to produce an evaluation result. The check at 920 can include determining that the third signal copy 140c of FIG. 5 does not meet the metric through use of the evaluation result. The third signal copy 140c of FIG. 5 can be disregarded when it is determined that the third signal copy 140c of FIG. 5 does not meet the metric.

In one embodiment, the metric is a threshold ranking. As part of the evaluating, a ranking hierarchy can be produced comprising the first signal copy, second signal copy, and third signal copy (e.g., a ranked order of the signal copies relative to power or reception angle). The metric can be a threshold ranking for inclusion in the combined signal 170 of FIG. 5 based on a set number of signals for combination. In one example, the four strongest signals can be combined together. If the third signal copy 140c of FIG. 5 is the fifth strongest signal, then it will be disregarded, but not if it is the second strongest signal. Logic can be used to break ties (e.g., two signals are tied as the fourth strongest signal and therefore randomly one signal is included and one is disregarded).

In one embodiment, the metric can be if addition of a signal copy significantly increases power of the combined signal 170 of FIG. 5. The reception angle of a signal copy can be so severe (e.g., far from perpendicular or orientated differently from an incoming signal) that adding the copy to the combined signal 170 of FIG. 5 can be of little value. Further, due to processing requirements and natural losses, the addition of the copy may be of negative value. Therefore, the metric can be a set power level or reception level that is pre-determined or organically developed. In one example, what rises to significant increases in power can be determined by a circuit designer or programmer.

Figure 10:
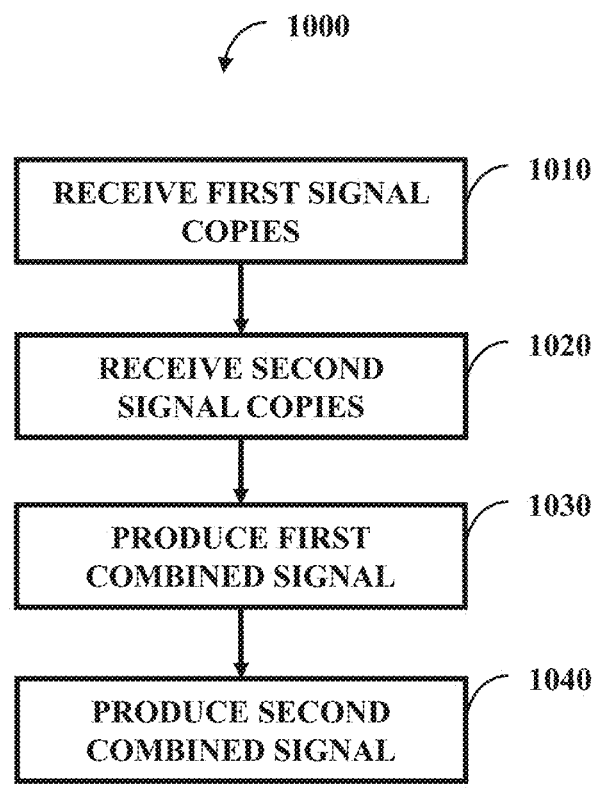
FIG. 10 illustrates one embodiment of a method comprising four actions.

FIG. 10 illustrates one embodiment of a method 1000 comprising four actions 1010-1040. Concurrently, an antenna array can receive two signals. In one example, referring to FIG. 1, the top five antenna elements can receive a first signal at 1010 while the bottom five antenna elements can receive a second signal distinct from the first signal at 1020. The system 100 of FIG. 1 can work to produce a first combined signal at 1030 and a second combined signal at 1040 (e.g., produce these concurrently).

In one embodiment, the system 100 of FIG. 1 can process a signal when one antenna element receives multiple signal copies (e.g., concurrently). In one example, a first signal can be received at the top (e.g., as shown in FIG. 1) and a second signal can be received from the right. Therefore, the second antenna element 160 of FIG. 1 can receive two signal copies from two different signals. The system 100 of FIG. 1 or another component can process this situation. In one example, a signal copy arriving at a more severe angle (e.g., further from perpendicular) can be disregarded (e.g., not sent to the system 100 of FIG. 1) while a less severe angle is included (e.g., sent to the system 100 of FIG. 1 and included in the combined signal 170 of FIG. 1). In one example, the copies can be need-based. In one example, one copy may be received by more elements than another (e.g., in FIG. 1, a signal directly from the top is intercepted by five elements while a signal directly from the right is intercepted by four elements). To create a balance, a weaker copy can be used over a stronger signal if fewer copies of the weaker signal are available. The system 100 of FIG. 1 and/or the respective antenna elements can be configured to process multiple signal copies received concurrently.

The combined signal 170 of FIG. 1 can be used in a superior manner than if just the signal copy 140a of FIG. 1 was used. This can be because the combined signal 170 of FIG. 1 is of greater power than the signal copy 140a of FIG. 1. With this greater power, the combined signal 170 can be processed faster, be clearer and therefore allow further operations to be performed that may not be available on a less clear signal, etc.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system, comprising:
    an obtainment component configured to obtain a first signal copy of a signal at a first power level received from a first antenna element and configured to receive a second signal copy of the signal at a second power level received from a second antenna element;
    a combination component configured to combine the first signal copy with the second signal copy to produce a combined signal of a combined power level;
    an evaluation component configured to evaluate the first signal copy, the second signal copy, and a third signal copy to produce an evaluation result; and
    a selection component configured to select a combination group for combination by the combination component, the selection being based, at least in part, on the evaluation result,
    where the combined power level is greater than the first power level,
    where the combined power level is greater than the second power level,
    where the first antenna element and the second antenna element are not the same antenna element,
    where the third signal copy is a copy of the signal at a third power level received from a third antenna element,
    where the combination group comprises the first signal copy and the second signal copy when the evaluation result suggests the first signal copy and the second signal copy should be part of the combination group,
    where the combination component is configured to combine the individual signal copies of the combination group into the combined signal, and
    where the obtainment component, the combination component, the evaluation component, the selection component, or a combination thereof is implemented, at least in part, by way of non-software.

2. The system of claim 1, where the first antenna element the second antenna element are part of a polygonal-forming array.

3. The system of claim 2, where the first antenna element and the second antenna element are adjacent to one another.

4. The system of claim 1, where the third signal copy is not part of the combination group and is not combined into the combined signal.

5. The system of claim 1, comprising:
    a delay component configured to delay the first signal copy such that the first signal copy is closer in phase to the second signal copy than absent the delay,
    where the combination component is configured to combine the first signal copy after delay with the second signal copy to produce the combined signal.

6. The system of claim 3,
    where the third antenna element is part of a polygonal-forming array,
    where the third antenna element is adjacent to the second antenna element,
    where the third antenna element is not adjacent to the first antenna element, and
    where the combination group does not comprise the third signal copy when the evaluation result suggests the third signal copy should not be part of the combination group.

7. The system of claim 1,
    where the evaluation component is configured to evaluate the first signal copy, the second signal copy, and a third signal copy with regard to a reception angle to produce the evaluation result.

8. The system of claim 1,
    where the evaluation component is configured to evaluate the first signal copy, the second signal copy, and a third signal copy with regard to a reception location to produce the evaluation result.

9. A system, comprising:
    a first antenna element configured to receive a first signal copy of a signal at a first power level from a first reception angle;
    a second antenna element configured to receive a second signal copy of the signal at a second power level from a second reception angle; and
    a third antenna element configured to receive a third signal copy of the signal at a third power level from a third reception angle,
    where a combiner collects and combines the first signal copy with the second signal copy to produce a combined signal of a combined power level,
    where the combiner does not combine the third signal copy into the combined signal
    where the combined power level is greater than the first power level, and
    where the combined power level is greater than the second power level.

10. The system of claim 9,
    where the first antenna element is adjacent to the second antenna element, where the second antenna element is adjacent to the third antenna element, where the first power level is greater than the second power level, and where the second power level is greater than the third power level.

11. The system of claim 9, comprising:

a transfer component configured to cause transfer of the first signal copy and second signal copy to the combiner and prevent transfer of the third signal copy to the combiner.

12. The system of claim 9, where the first power level is proportional to the first reception angle, where the second power level is proportional to the second reception angle, where the third power level is proportional to the third reception angle, and where the combiner does not combine the third signal copy due to the third reception angle being too small in comparison to a threshold.

13. The system of claim 9, where the first antenna element, the second element, and the third antenna element are part of an enclosed polygonal array.

14. The system of claim 9, where prior to being combined by the combiner, the first signal copy is subjected to phase delay to bring the first signal copy closer in phase to the second signal copy.

15. The system of claim 14, comprising:

the combiner, where prior to being combined by the combiner, the third signal copy is subjected to phase delay to bring the third signal copy closer in phase to the second signal copy.

16. A method, comprising:

receiving a first signal copy at a first power level intercepted by a first antenna element at a first reception angle;

receiving a second signal copy at a second power level intercepted by a second antenna element at a second reception angle;

combining the first signal copy and the second signal copy into a combined signal with a combined power; and delaying, expressly, a phase of the first signal copy to bring the first signal copy closer in phase to the second signal copy, where the combined power level is greater than the first power level, where the combined power level is greater than the second power level, and where the first antenna element and the second antenna element are not the same antenna element, where the first antenna element and the second antenna element are part of an enclosed polygonal array, where the first power level is proportional to the first reception angle, and where the second power level is proportional to the second reception angle, where combining the first signal copy and the second signal copy into the combined signal with the combined power comprises combining the first signal copy after being delayed and the second signal copy into the combined signal with the combined power, and where the second signal copy is not delayed expressly.

17. The method of claim 16, comprising:

receiving a third signal copy at a third power level intercepted by a third antenna element at a third reception angle; and disregarding the third signal copy such that the third signal copy is not combined into the combined signal, where the first antenna element and the third antenna element are not the same element, where the second antenna element and the third antenna element are not the same element, where the third antenna element is part of the enclosed polygonal array.

18. The method of claim 17, comprising:

evaluating the third signal copy against a metric to produce an evaluation result; and determining that the third signal copy does not meet the metric through use of the evaluation result, where the third signal copy is disregarded when it is determined that the third signal copy does not meet the metric.

19. The method of claim 18, comprising:

producing a ranking hierarchy comprising the first signal copy, second signal copy, and third signal copy, where the metric is a threshold ranking for inclusion in the combined signal based on a set number of signals for combination.

20. The method of claim 18, where the metric is if addition of a signal copy significantly increases power of the combined signal.

* * * * *